United States Patent
Spitz et al.

(10) Patent No.: US 9,155,246 B2
(45) Date of Patent: Oct. 13, 2015

(54) RIDING TYPE MOWER

(71) Applicant: KUBOTA CORPORATION, Osaka (JP)

(72) Inventors: David Spitz, Atlanta, GA (US); Takeshi Komorida, Duluth, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 13/656,931

(22) Filed: Oct. 22, 2012

(65) Prior Publication Data

US 2014/0109535 A1  Apr. 24, 2014

(51) Int. Cl.
*A01D 34/82*  (2006.01)
*B60K 15/073*  (2006.01)
*B60K 15/03*  (2006.01)
*B60K 15/063*  (2006.01)

(52) U.S. Cl.
CPC .......... *A01D 34/82* (2013.01); *B60K 15/03177* (2013.01); *B60K 15/073* (2013.01); *B60K 2015/0637* (2013.01); *B60K 2015/0638* (2013.01)

(58) Field of Classification Search
CPC .......... B60K 8/00; B60K 13/04; B60K 15/03; B60K 15/063; B60K 15/067; A01D 34/82; F02M 35/04; F02M 25/0854
USPC ............... 296/193.01; 180/291, 309, 314; 123/519; 280/834; 56/14.7
See application file for complete search history.

(56) References Cited

U.S. PATENT DOCUMENTS

| 5,133,588 | A  | * | 7/1992 | Hutchinson et al. | 297/188.07 |
| 5,347,799 | A  |   | 9/1994 | Hosaka et al. | |
| 7,758,075 | B2 | * | 7/2010 | Isayama et al. | 280/834 |
| 7,849,837 | B2 | * | 12/2010 | Hasebe et al. | 123/516 |
| 7,854,345 | B2 | * | 12/2010 | Kallevig et al. | 220/562 |
| 7,931,301 | B2 | * | 4/2011 | Matsumoto | 280/834 |
| 2004/0076776 | A1 | * | 4/2004 | Ishikawa et al. | 428/34.1 |
| 2008/0302805 | A1 | * | 12/2008 | Komorida et al. | 220/562 |
| 2010/0242924 | A1 | * | 9/2010 | Ochi et al. | 123/519 |
| 2011/0192858 | A1 | * | 8/2011 | Kisiler et al. | 220/720 |
| 2013/0240283 | A1 | * | 9/2013 | Spitz et al. | 180/291 |

FOREIGN PATENT DOCUMENTS

JP  H05-246256  9/1993

OTHER PUBLICATIONS

U.S. Appl. No. 13/423,551 to David Spitz et al., filed Mar. 19, 2012.

* cited by examiner

*Primary Examiner* — Brodie Follman
*Assistant Examiner* — Brian Cassidy
(74) *Attorney, Agent, or Firm* — Greenblum & Bernstein, P.L.C.

(57) ABSTRACT

A riding mower includes a mower body frame extending in front-and-rear directions between a pair of left and right rear wheels, a horizontal installation surface defined in an area near the rear wheels, an engine arranged on the installation surface, rearward of axle(s) of the rear wheels, an operator's seat arranged forward of the engine, and a fuel tank. The fuel tank includes a front tank portion extending in the front-and-rear directions below the operator's seat, and a rear tank portion connected with the front tank portion, extending in mower body front-and-rear directions on one side of the engine in mower body transverse directions, and extending higher than the front tank portion.

20 Claims, 9 Drawing Sheets

RIDING TYPE MOWER

TECHNICAL FIELD

The present invention relates to a riding mower provided with an engine mounted to a rear part of a mower body, an operator's seat arranged forward of the engine, and a fuel tank where fuel for the engine is accommodated.

THE BACKGROUND ART

JP05-246256A discloses a riding mower provided with an engine mounted to a rear part of a mower body, an operator's seat arranged at a location immediately front of the engine, a battery arranged in a space below the operator's seat, and a fuel tank. In this riding mower, since the heavy battery and fuel tank are arranged below the operator's seat, a rearward shift of the center of gravity due to the engine mounted in the rear part is resolved and, thereby improving the weight balance of the entire mower body. However, since the space below the operator's seat is limited, a large-capacity fuel tank cannot be arranged. If the large-capacity fuel tank is arranged forcibly, it may cause another problem that the operator's seat is located high.

U.S. Pat. No. 5,347,799 discloses a riding mower in which an engine, a fuel tank, and an air cleaner are arranged in a horizontal plane behind an operator's seat. In this case, the fuel tank is located lateral to the engine, and the air cleaner is located behind the fuel tank. Since the fuel tank, the operator's seat, the engine, and the air cleaner are arranged without overlapping with each other when seen from above of the riding mower, it becomes possible to suppress the height of the riding mower. However, the capacity of the fuel tank becomes smaller, resulting in more frequent refueling.

SUMMARY OF INVENTION

In view of the current situation described above, a riding mower in which a large-capacity fuel tank is effectively arranged is demanded. A riding mower according to the present invention includes a mower body frame extending in front-and-rear directions between a pair of left and right rear wheels, a horizontal installation surface defined in an area near the rear wheels, an engine arranged on the installation surface, rearward of one or two axles of the rear wheels, an operator's seat arranged forward of the engine, and a fuel tank. The fuel tank includes a front tank portion extending in the front-and-rear directions below the operator's seat, and a rear tank portion connected with the front tank portion, extending in mower body front-and-rear directions on one side of the engine in mower body transverse directions, and extending higher than the front tank portion.

With this configuration, the fuel tank is substantially sectioned into the front tank portion arranged below the operator's seat and the rear tank portion arranged lateral to the engine. Regarding the front tank portion, although the extension thereof in a height direction is limited by the operator's seat, a large capacity can be secured by a horizontal extension because the horizontal extension is relatively free. Regarding the rear tank portion, although its horizontal extension is limited by the engine, a large capacity can be secured by extending to a high location because an extension in the height direction is free.

In addition, the capacity of the rear tank portion can also be increased by increasing the extension thereof in the mower body front-and-rear directions. In a suitable embodiment of the present invention, the rear tank portion extends at least to a rear end of the engine in the mower body front-and-rear directions. Further, the rear tank portion may be extended to a rear end of the mower body in the mower body front-and-rear directions.

In a suitable embodiment, a canister, which is necessary to be connected with the engine and the fuel tank and connected with the engine and the fuel tank, is located below the installation surface and near a boundary between the engine and the rear tank portion. Thus, regardless of a length of piping connecting the canister with the engine and the fuel tank being shorter, a possibility of the canister interfering with other engine accessories and the like is low.

DESCRIPTION OF EMBODIMENTS

Figure 1:
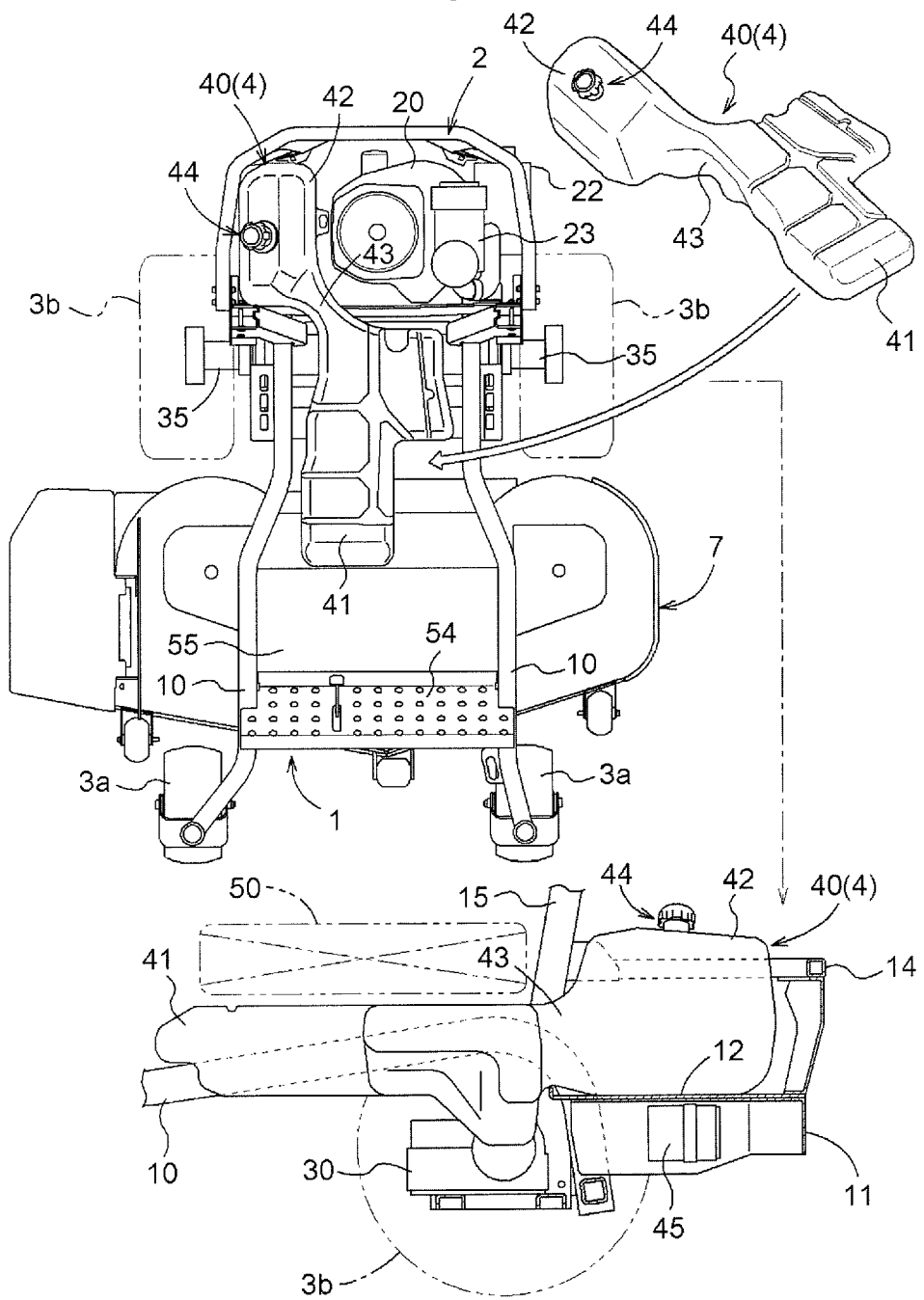
FIG. 1 is a schematic view illustrating a basic shape of a fuel tank and a basic arrangement of the fuel tank, in a riding mower according to the present invention.

Before particularly describing of one embodiment of a riding mower according to the present invention, characteristic and fundamental shape and arrangement of a fuel tank 40 which constitutes a fuel unit 4 provided to the riding mower are described with reference to FIG. 1. FIG. 1 illustrates the fuel tank 40, which is shown in a perspective view, mounted to the riding mower shown in a plan view, and mounted to the riding mower shown in a side view. Note that, unless otherwise particularly noted, "front" or "forward" means front or forward in a traveling direction of a mower body, and "rear" or "rearward" means rear or rearward in the traveling direction. In addition, left-and-right directions mean width directions of the mower body (transverse directions of the mower body).

This riding mower includes a mower body frame 1 comprised of a front frame 10 and a rear frame which are coupled to each other in front-and-rear directions of the mower body, and a pair of left and right front wheels 3a and a pair of left and right rear wheels 3b are provided to the mower outside the mower body frame 1. Between the rear wheels 3b, a horizontal installation surface 12 is defined by one or both of the mower body frame 1 and a member supported by the mower body frame 1. An engine 20, which is a primary component of a drive 2, is arranged on the installation surface 12 substantially in a center part in the transverse direction of the mower body, rearward of axles 35 of the rear wheels 3b. A mower unit 7 is arranged between the front wheels 3a and the rear wheels 3b, and a horizontal floor 55 and an inclined footrest 54 are provided above the mower unit 7, for an operator.

The fuel tank 40 mounted to the riding mower includes a front tank portion 41 extending in the front-and-rear directions, a rear tank portion 42 extending higher than the front tank portion 41, and a neck-shaped transition portion 43 connecting the front tank portion 41 with the rear tank portion 42 in the front-and-rear directions. The front tank portion 41 has such dimensions and geometry in its mounted state that it enters a space extending under an operator's seat 50, which is only schematically shown in FIG. 1. The rear tank portion 42 has such dimensions and geometry in its mounted state that one side of the engine 20 in the mower body transverse direction reaches near a rear end of the mower body frame 1.

Although not clearly shown in FIG. 1, a canister 45 is arranged near the boundary between the engine 20 and the rear tank portion 42, below the installation surface 12. The canister 45 is connected with the engine 20 and the fuel tank 40 via piping.

The front tank portion 41 extends from a front end part to a rear end part of the operator's seat 50 when seen from above of the mower body, and its upper surface is flat. Note that, if a component, such as a battery, needs to be arranged under the operator's seat 50, an end area of one side of the front part of the front tank portion 41 is recessed so that it creates a quadrangle space, and the battery B is therefore arranged within the quadrangle space.

In order to increase the capacity of the rear tank portion 42, it is preferred that the rear tank portion 42 has at least a shape extending upwardly from the installation surface 12 up to the height of the engine 20. A fueling unit 44 is attached to an upper face part of the rear tank portion 42 which stands up to the height corresponding to the height of the engine 20. Thus, the height of a fueling port becomes suitable. In addition, in order to facilitate refueling via the fueling port, it is preferred to incline a fueling pipe which forms the fueling port so that the fueling port of the fueling unit faces toward outside in the mower body transverse direction. Further, when refueling, in order to prevent a standing position of a refueling person from being blocked by the rear wheel 3b, the fueling unit 44 is mounted to an upper face part of the rear tank portion 42 so that the fueling port is located rearward of the rear wheel.

If the rear tank portion 42 is arranged lateral to the engine 20 while it has a length being substantially in agreement with a front-to-rear length and a height of the engine 20, an outer contour of the rear end area of the mower body is substantially determined by the rear tank portion 42 and the engine 20. In the riding mower of such a form, if an outer frame 14 is provided so as to conform to the outer contour of the rear part of the mower body at the height of the engine, where the outer contour is defined by the engine and the rear tank portion, it is convenient because the rigidity of the rear part of the mower body increases and the outer frame also functions as a guard fence of the equipment.

Most part of the bottom of the front tank portion 41 and the rear tank portion 42 forms substantially the same horizontal plane; thereby the fuel tank 40 is stably placed on the installation surface 12. This also contributes to vehicle stability; because fuel will remain in the front tank portion 41 and the rear tank portion 42 even if the remaining fuel becomes low. First, in the example of FIG. 1, although a hang-down portion, which projects downwardly below the installation surface 12 from the bottom side of the front tank portion 41, is formed, since the projecting portion is located substantially at the center in the mower body transverse direction, the vehicle stability can be maintained even when fuel remains only in the hang-down portion.

Figure 2:
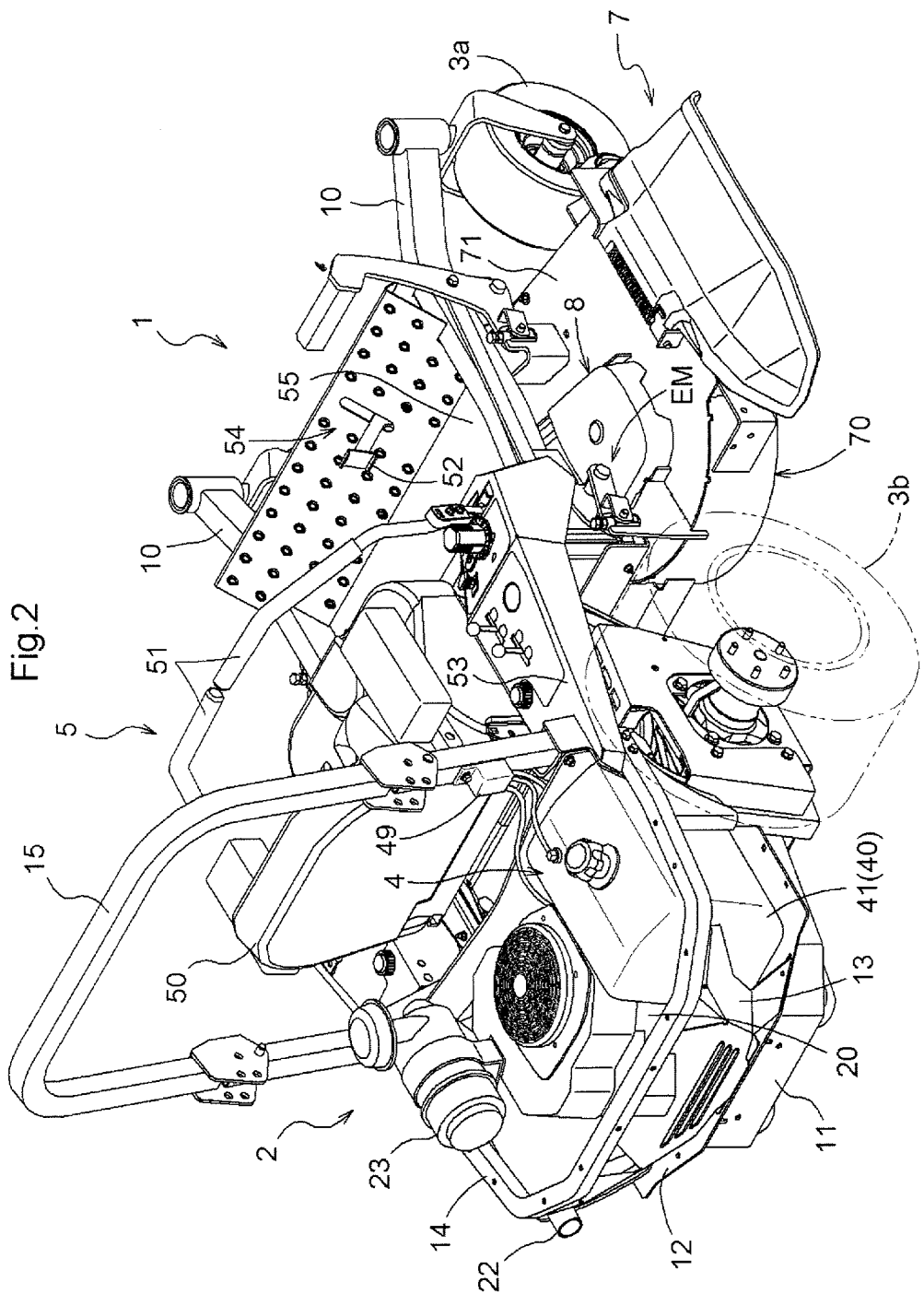
FIG. 2 is an entire external view of a zero-turn mower, showing one example embodiment of the riding mower according to the present invention.
Figure 3:
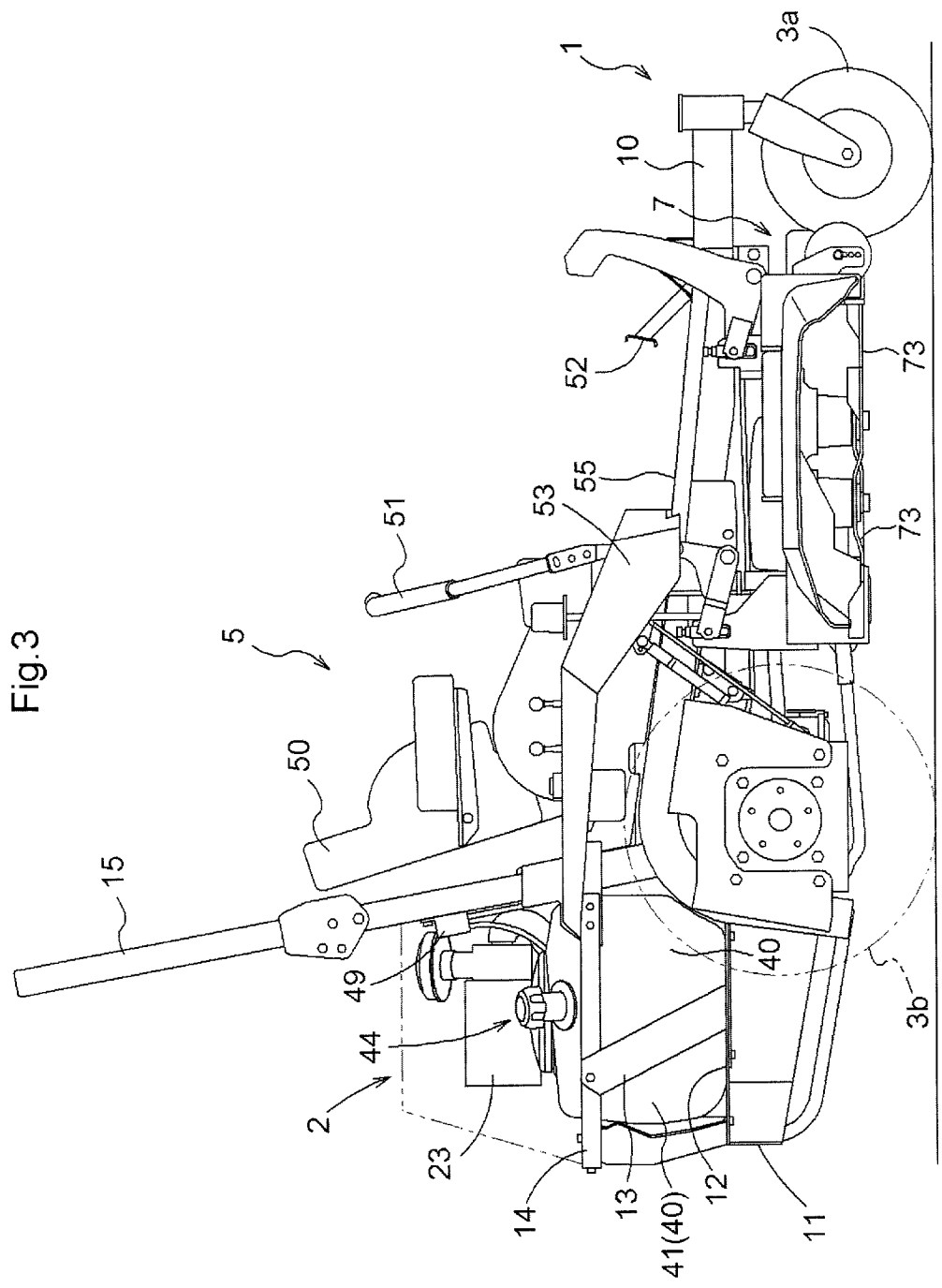
FIG. 3 is a side view of the zero-turn mower.
Figure 4:
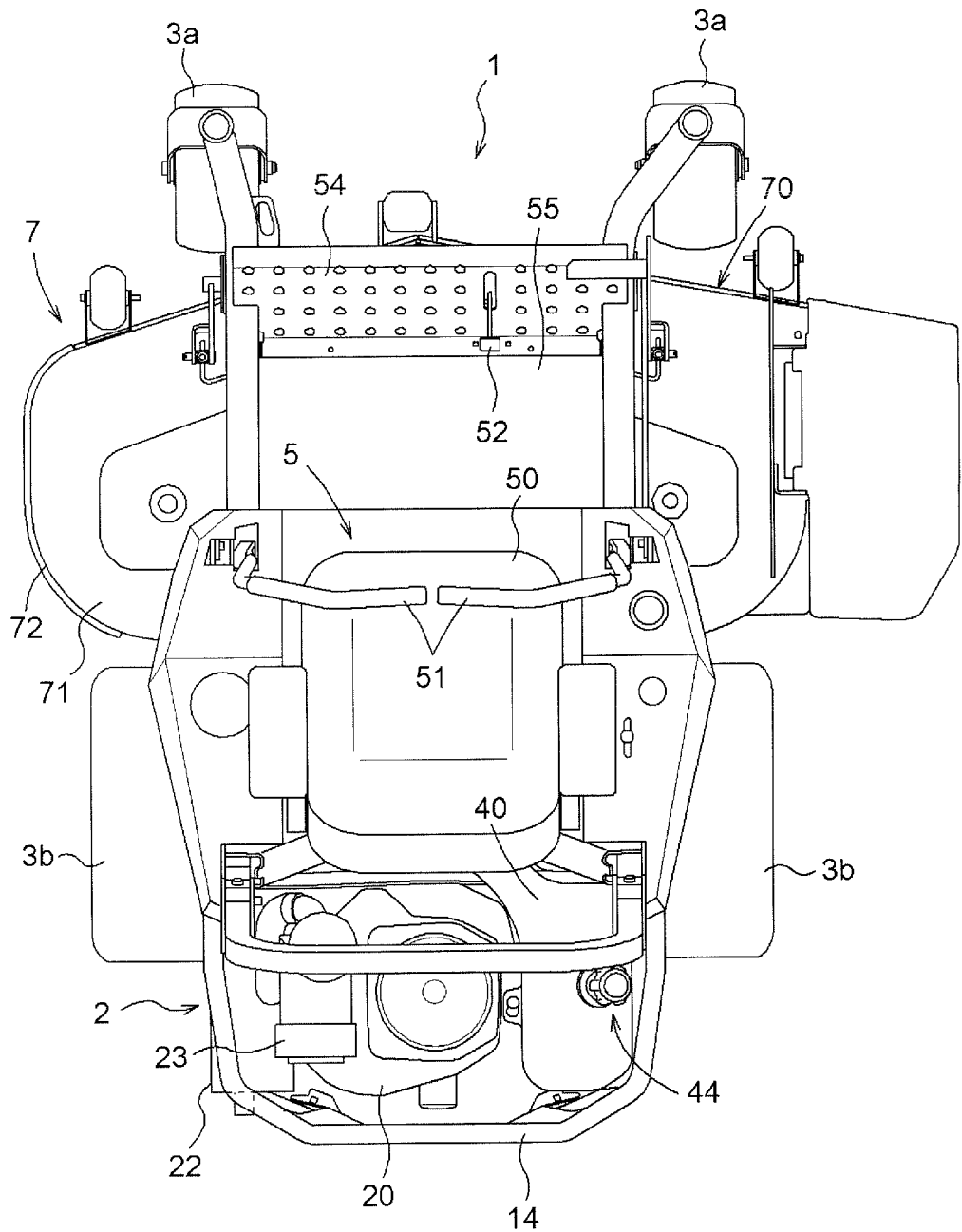
FIG. 4 is a plan view of the zero-turn mower.
Figure 5:
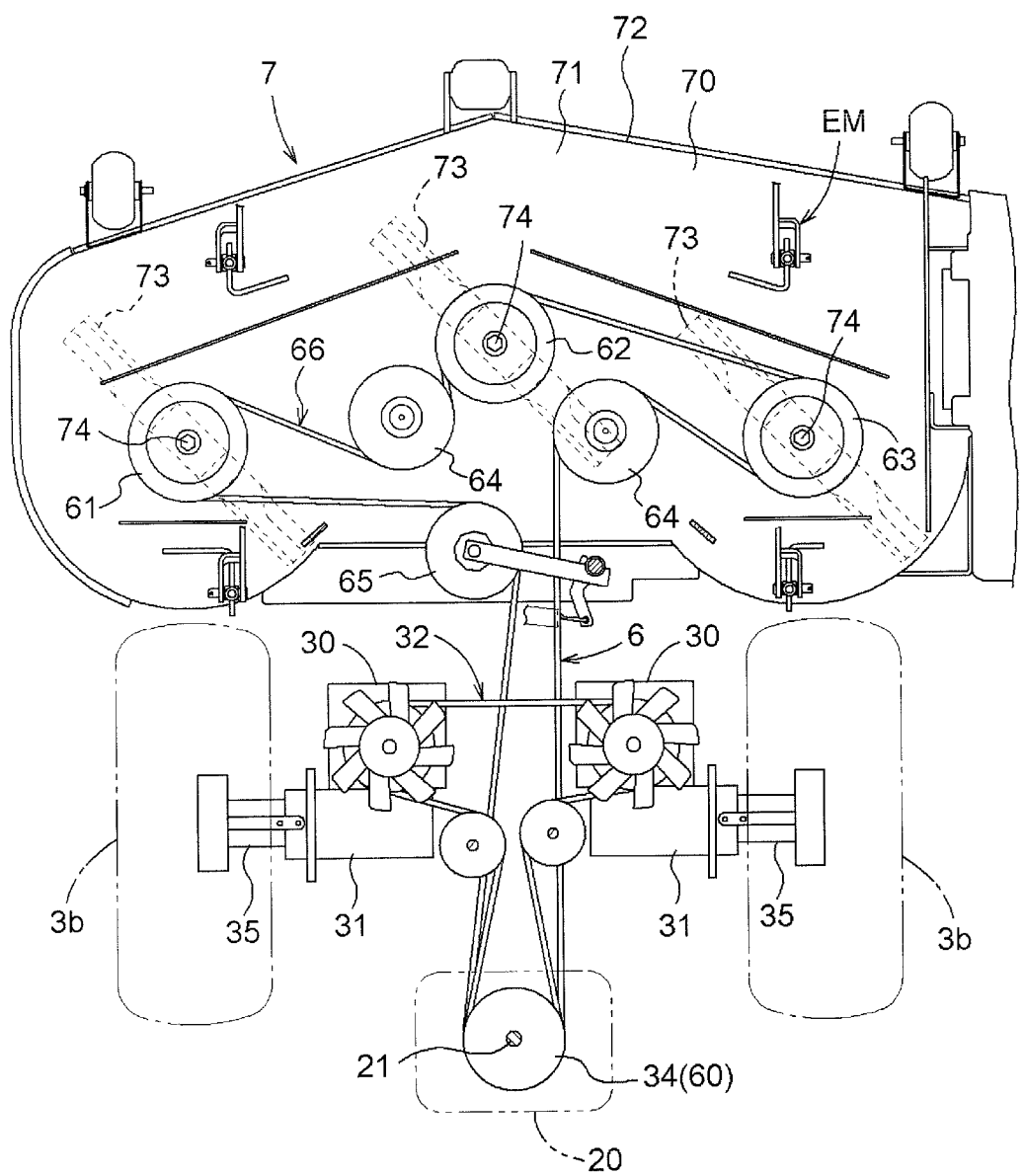
FIG. 5 is a power transmission system diagram of the zero-turn mower.

Hereinafter, a particular embodiment of the present invention is described with reference to the accompanying drawings. FIG. 2 is an entire external view of a zero-turn mower, FIG. 3 is a side view thereof, and FIG. 4 is a plan view thereof. FIG. 5 shows a power system in the zero-turn mower. The illustrated zero-turn mower, the riding mower according to the present invention includes the mower body frame 1 supported by the pairs of left and right front wheels 3a and rear wheels 3b, and the left and right rear wheels 3b are possible to be controlled independently of its normal rotation or reverse rotation and a rotating speed. Such a riding mower is referred to as "the zero-turn mower."

Primary components of the mower body frame 1 are the front frame 10 and a rear frame 11 which are each comprised of, for example, a square pipe. Between the pair of left and right front wheels 3a and the pair of left and right rear wheels 3b, the mower unit 7 is suspended from the front frame 10 so as to be vertically movable via an elevation mechanism EM. The elevation mechanism EM has a function to move the mower unit 7 upward and downward while keeping the mower unit 7 horizontal, through a pedal operation or a lever operation.

The front frame 10 is provided with the floor 55 made from a sheet metal to cover substantially the entire part of the front frame 10 from above. Although not illustrated, a rubber-made mat is placed on the floor 55. The footrest 54 having a slope is provided to a front end of the floor 55. An elevation control pedal 52 for allowing the operator to elevate the mower unit 7 via the elevation mechanism EM is arranged at the center of the slope of the footrest 54. A cockpit 5 is formed behind the floor 55 in a form where the cockpit 5 is located one step higher than the floor 55, and the operator's seat 50 is arranged at the center of the cockpit 5. A fender 53 and an operating lever 51 are arranged lateral to the operator's seat 50 on both sides, respectively. Various control levers, control buttons and the like are arranged on an upper surface of the fenders 53. An arch-shaped ROPS (Rollover Protective Structure) 15 stands behind the operator's seat 50. The ROPS 15 is formed from a square pipe. The drive 2 is formed including the gasoline engine 20, in an area behind the ROPS 15 in the mower body front-and-rear directions.

The rear frame 11 has an arch shape in a plan view, and is comprised of a pair of left and right straight frame portions extending near the rear wheels 3b in the front-and-rear directions, and a curved frame portion which is formed in a rearward convex shape and connects the left and right straight frame portions. In a rear part of the rear frame 11 behind the operator's seat 50, a substantially horizontal installation surface, which is a reference surface for the various equipment constituting the power source including the engine 20, is defined. This installation surface 12 corresponds to an upper surface of a floor plate member attached onto the rear frame 11. Further, a vertical frame 13 stands from the upper part of the rear frame 11 so as to be spaced apart from the upper part by a predetermined interval, a cylindrical outer frame 14 having a shape similar to the outer contour of the rear frame 11 is attached to an upper part of the vertical frame 13.

First, the engine 20 is mounted near the center of the installation surface 12 so as to be in a posture in which an output shaft of the engine 20 projects downwardly. The rear tank portion 42 of the fuel tank 40, which constitutes the fuel unit 4, is arranged from a forward area of the engine 20 to a rightward area of the engine 20. A muffler 22 is arranged in a leftward area of the engine 20, and an air cleaner 23 is arranged above a left end of the engine 20.

Schematically shown in FIG. 5, an HST (Hydrostatic Transmission) 30 and a gear transmission mechanism 31 which transmit a driving force to the axle 35 of the rear wheel 3b are provided, respectively. Between the output shaft 21 of the engine 20 and each HST 30, a belt transmission mechanism 32 for vehicle traveling is provided to transmit an engine output to the HSTs 30. The output shaft of the HST 30 is coupled to the axle 35 of the rear wheel 3b, respectively. A traveling output pulley 34, which constitutes the belt transmission mechanism 32 for vehicle traveling, is provided onto the output shaft 21. A transmission control shaft (not shown) of each HST 30 is associated with corresponding one of the operating levers 51 via an operation link mechanism so that a gear shift is made based on a pivot operation of the operating lever 51 in a front direction or a rear direction, which is provided in immediately front of, and laterally to the operator's seat 50 on the left and right sides.

Because of this configuration, by pivoting the left and right operating levers 51 in the front-and-rear directions, the HSTs 30 corresponding to the respective operating levers 51 can be changed in the shift position and, thus, the left and right rear wheels 3b can be independently driven and changed in gear. That is, in this riding type mower, by equipping the left and right front wheels 3a followable to steering and by equipping the left and right rear wheels 3b independently drivable and changeable in transmission ratio, the configuration can yield any one of a stopping state where the left and right rear wheels 3b is stopped, a straight traveling state where the left and right rear wheels 3b are driven and rotated at a constant speed in the normal direction or a reverse direction, a slow turn state where the left and right rear wheels 3b are driven and rotated at different speeds in the normal direction or the reverse direction, a pivot turn state where one of the left and right rear wheels 3b is stopped and the other is driven and rotated in the normal direction or the reverse direction, or a spin turn state where one of the left and right rear wheels 3b is driven and rotated in the normal direction and the other is driven and rotated in the reverse direction.

Between the pair of left and right front wheels 3a and the pair of left and right rear wheels 3b, the mower unit 7 is suspended from the front frame 10 so as to be moved upward and downward via the link-type elevation mechanism EM. As shown in FIG. 5, three blades 73 aligned in the mower body transverse direction are provided in an internal space formed by a top plate 71 and a side plate 72 of a mower deck 70 which constitute the mower unit 7. Each blade 73 is fixed to a drive shaft 74 which is supported by the top plate 71 of the mower deck 70 via bearings. In order to transmit power to each drive shaft 74 from the output shaft 21 of the engine 20, a pulley-type power transmission mechanism 6 is provided. This pulley-type power transmission mechanism 6 is constructed as a belt transmission mechanism, and a mower output pulley 60 is provided onto the output shaft 21, below the traveling output pulley 34. That is, the belt transmission mechanism 32 for vehicle traveling and the belt transmission mechanism 6 for the mower unit, which use the output shaft 21 of the engine 20 as their input shaft, are arranged in mutually independent planes at different height levels. Thus, the mower unit 7 is transmitted with power at a constant speed, regardless of a traveling speed or a traveling state.

The belt transmission mechanism 6 which transmits power to the mower unit 7 includes, other than the mower output pulley 60, a first pulley 61, a second pulley 62 and a third pulley 63 which are attached to parts of the three drive shafts 74 extending upwardly from the top plate 71 and arranged in the left-and-right directions, and two direction change pulleys 64, and a tensioning pulley 65. A belt 66 is wound around these pulleys. As seen from FIGS. 2, 4, and 5, in order to increase a mowing width, a left-and-right length of the mower unit 7 is longer than a mower body width (i.e., a left-and-right length of the mower body 1), and left and right ends thereof are projected outside the mower body 1. Thus, although the upper part of the second pulley 62 located at the center is covered with the mower body frame 1, the upper parts of the first pulley 61 and the third pulley 63 are exposed. For this reason, the first pulley 61 and the third pulley 63 are covered with covers 8.

Figure 6:
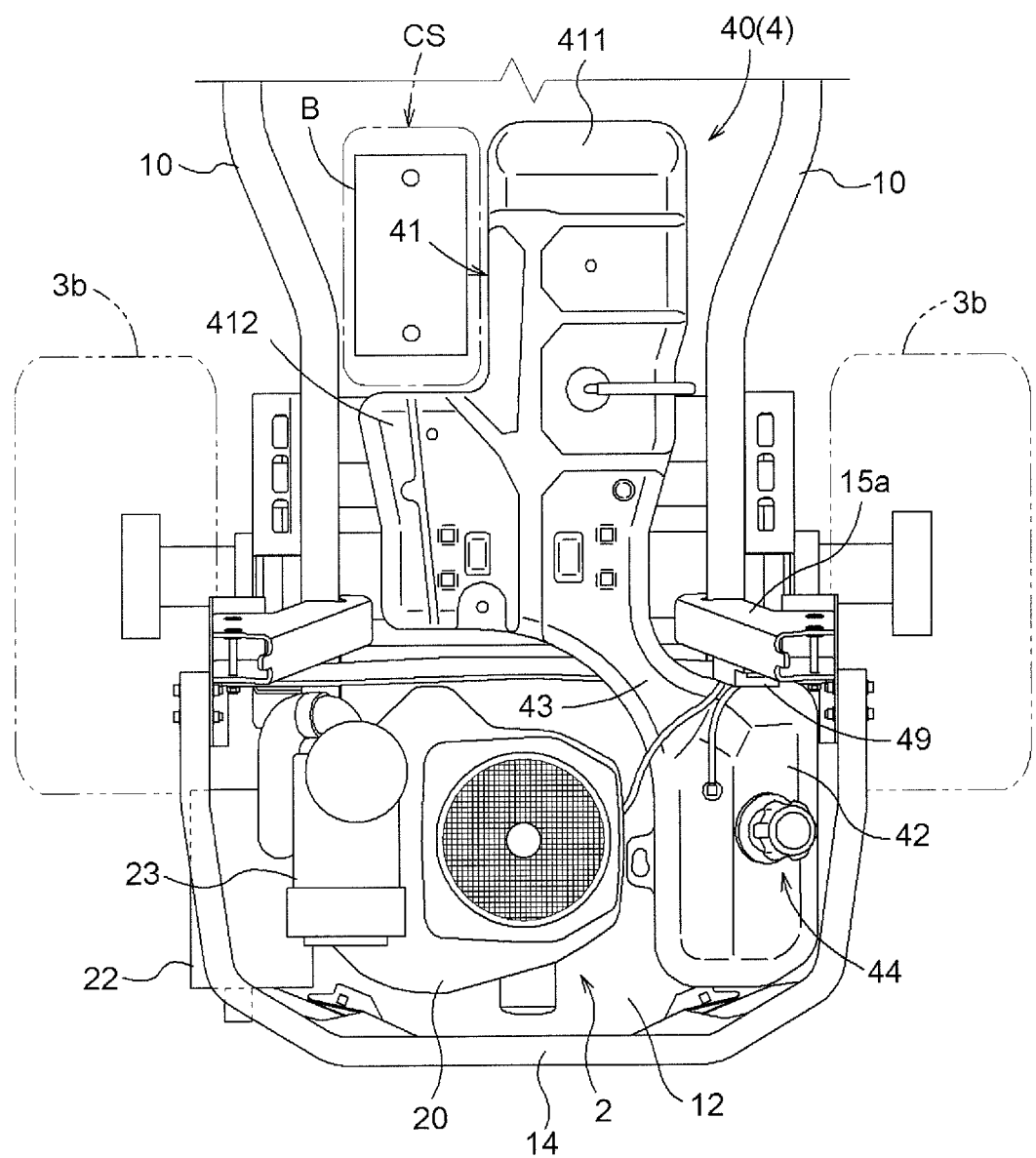
FIG. 6 is a plan view showing the fuel tank and an engine in a state where an operator's seat is removed.

FIG. 6 is a plan view showing a rear half area of the zero-turn mower in a state where the operator's seat 50 is removed. As is clear from FIG. 6, the fuel tank 40 includes the front tank portion 41 located below the operator's seat 50, the rear tank portion 42 located laterally to the engine 20 on the right, the transition portion 43 which communicates and connects the front tank portion 41 with the rear tank portion 42, and the fueling unit 44.

Fundamentally, although the front tank portion 41 extends throughout the width of the operator's seat 50, over the full length of the operator's seat 50 from the front end to the rear end, a front left area thereof is recessed so that it creates a quadrangle space CS. The battery B, which is substantially in agreement with the volume, is arranged in the quadrangle space CS. In other words, the front tank portion 41 is comprised of a projected portion 412 projected leftward from the rear half of an elongated rectangular parallelepiped portion 411.

Figure 7:
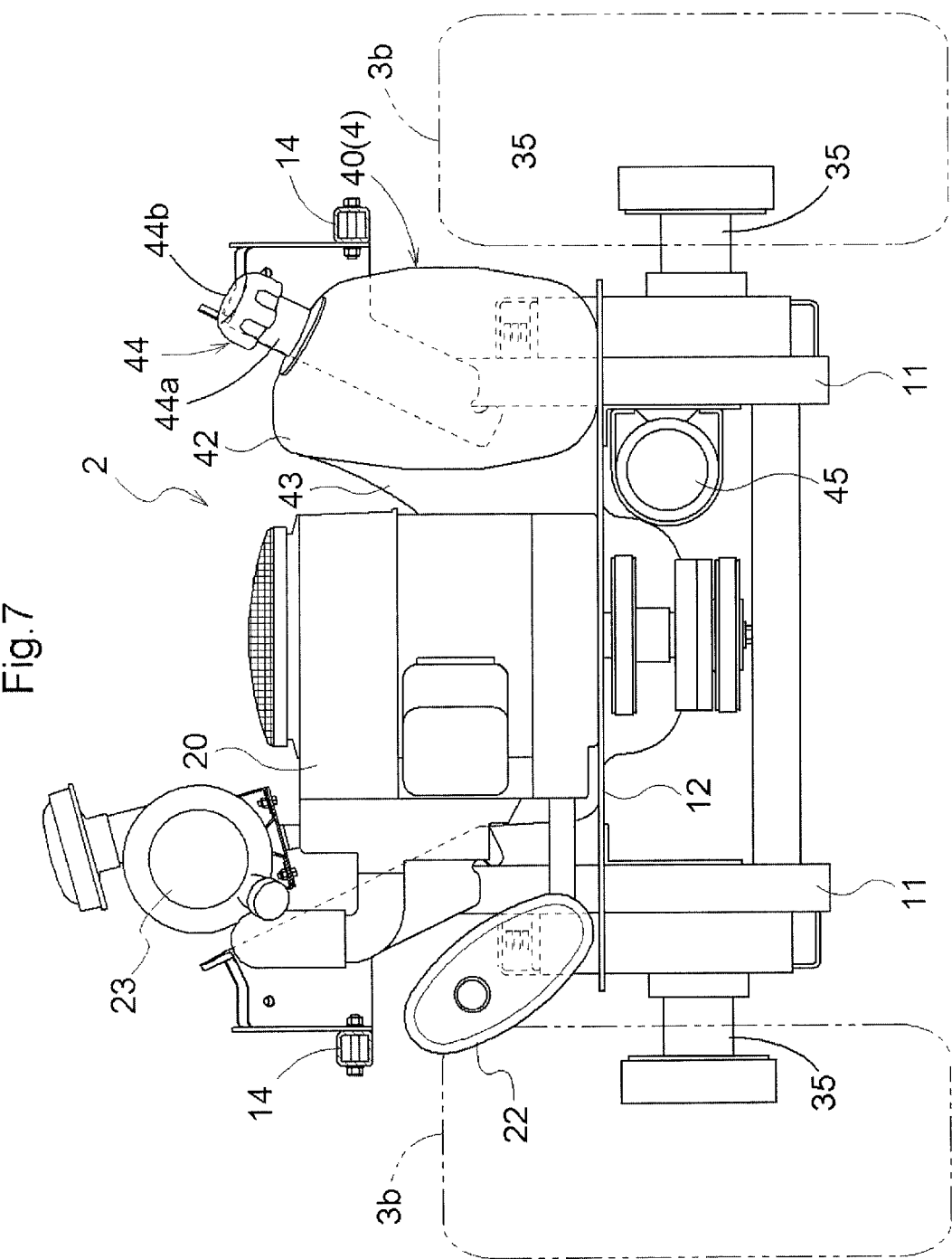
FIG. 7 is a rear elevational view showing an arrangement of the fuel tank, the engine, and a canister.

The rear tank portion 42 has substantially the same length in the front-and-rear directions as the length of the engine 20 in the front-and-rear directions, and as is clear from FIG. 7, it also has substantially the same height as the height of the engine 20. The transition portion 43 has a neck-like shape which smoothly connects a rear right end of the front tank portion 41 with a rear left end of the rear tank portion 42. Since the rear tank portion 42 is arranged immediately behind a right support pillar 15a of the ROPS 15, the transition portion 43 extends so as to conform to a rear face and a left face of the right support pillar 15a. The fueling unit 44 is mounted onto the upper surface of the rear tank portion 42. The fueling unit 44 includes a fueling pipe 44a inserted into the tank, and a fuel cap 44b for the fueling port formed at the upper end of the fueling pipe 44a.

As shown in FIG. 7, the canister 45 having a substantially cylindrical shape is attached to an inwardly-facing side face of the rear frame 11, under the installation surface 12, using a bracket. Since the canister 45 is located near the boundary between the engine 20 and the rear tank portion 42, it has such a spatial relationship that it is located close to both of the engine 20 and the rear tank portion 42. The muffler 22 is arranged laterally to the engine 20 on the left side.

Figure 8:
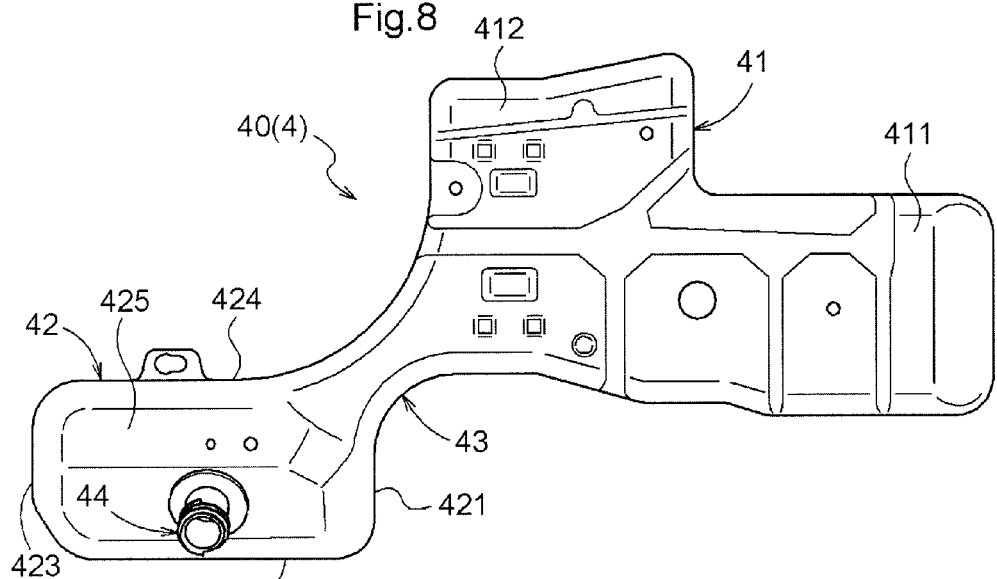
FIG. 8 is a plan view of the fuel tank.
Figure 9:
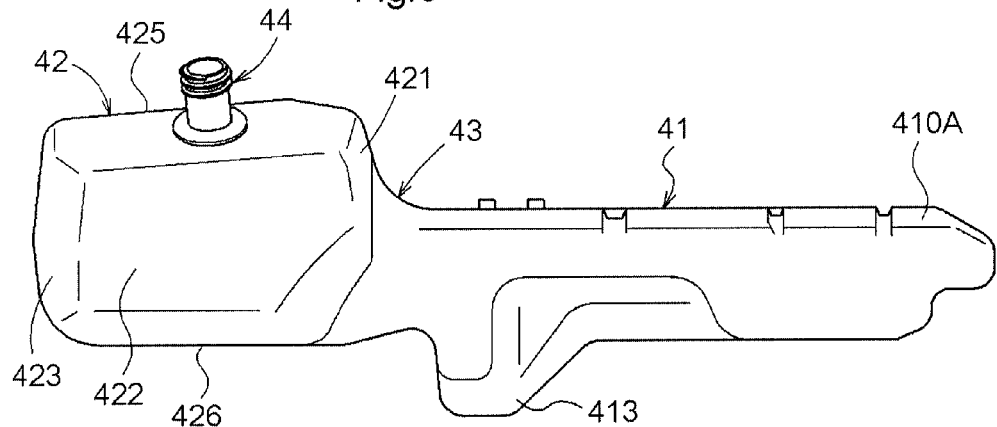
FIG. 9 is a side view of the fuel tank.
Figure 10:
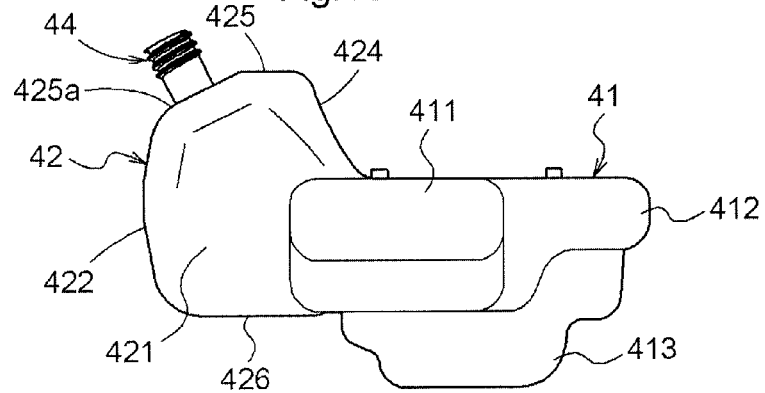
FIG. 10 is an elevational view of the fuel tank.

Next, the fuel tank 40 is described in detail referring to FIGS. 8, 9, and 10. As understood from FIG. 8, the fuel tank 40 has such a shape that three corners of a rectangular shape are cut off by respective small rectangles, when seen from above. A projection area of the front tank portion 41 from above comprised of a rectangular parallelepiped portion 411 and a projected portion 412 is larger compared with a projection area of the rear tank portion 42. As is clear from FIGS. 9 and 10, a hang-down portion 413 is formed projecting downwardly from the bottom of the projected portion 412 of the front tank portion 41. The rear tank portion 42 has a substantially rectangular parallelepiped shape which is comprised of a front face 421, a right face 422, a rear face 423, a left face 424, an upper face 425, and a bottom face 426. The right half of the upper face 425 is formed as the slope 425a, and the fueling pipe 44a of the fueling unit 44 is inserted into the tank from the slope 425a.

Figure 11:
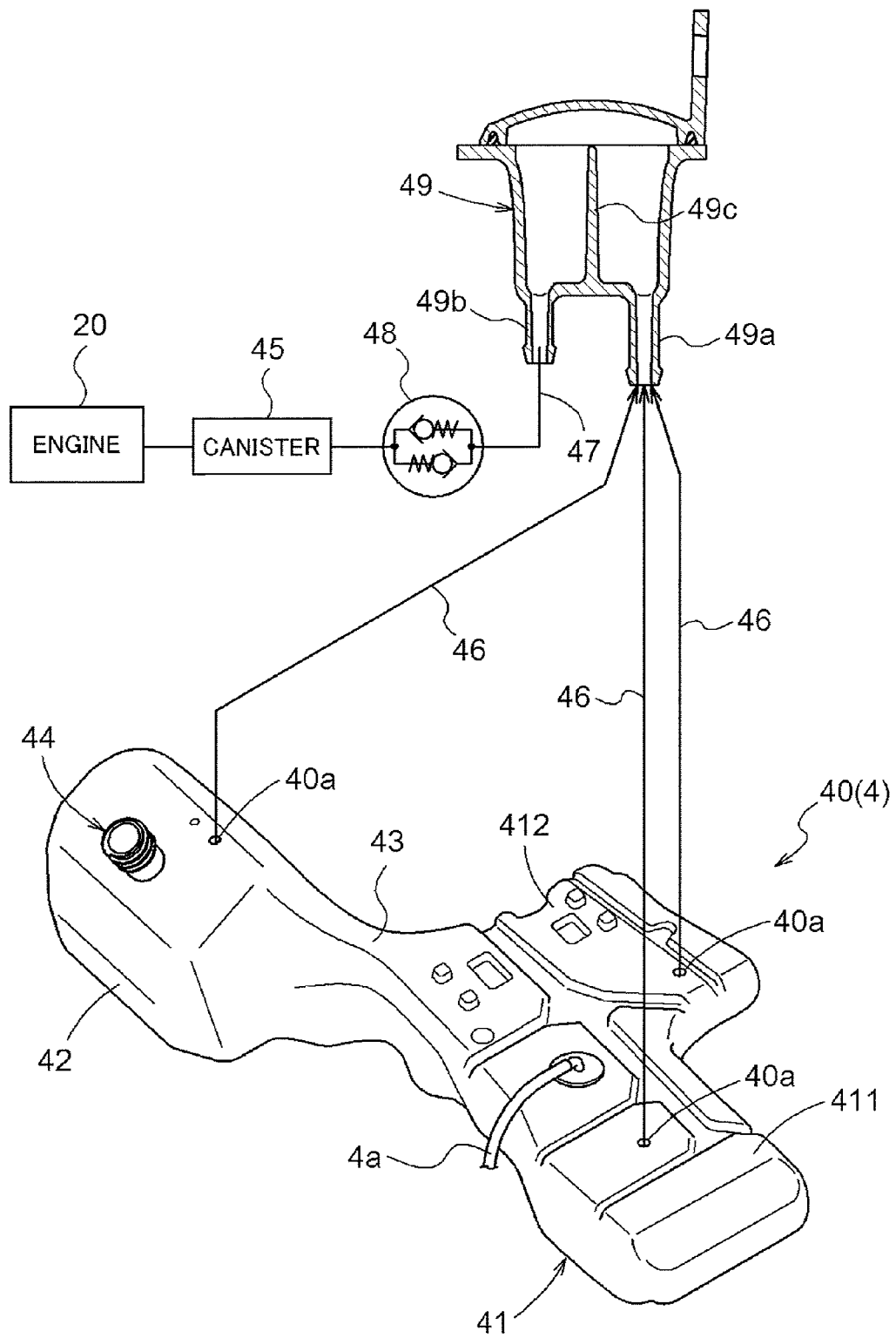
FIG. 11 is a schematic view showing a connecting relation of the fuel tank, a separator, and the canister.

A fuel evaporative control system illustrated in FIG. 11 is incorporated into the fuel unit 4. The fuel evaporative control system is constructed so that evaporated fuel gas (hereinafter, simply referred to as "evaporative") inside the fuel tank 40 is sucked into the engine 20 on intake stroke and combusted. Components of the evaporative control system include a canister 45, a two-way valve 48, a separator 49, and gas passages 46 and 47 which connect these components. Evaporative ports 40a through which the evaporative passes are formed in an upper surface of the rectangular parallelepiped portion 411 of the front tank portion 41, and an upper surface of the projected portion 412 and an upper face 425 of the rear tank portion 42, respectively. Three inflow nozzles 49a into which the evaporative flows, respectively, and a single outflow nozzle 49b from which the evaporative flows, are formed in the bottom of the separator 49. A space communicating with the outflow nozzles 49a and a space communicating with the outflow nozzle 49b are isolated from each other with a partition wall 49c except for an area above the spaces. The three inflow nozzles 49a of the separator 49 are connected with the three evaporative ports 40a via the gas passages 46, respectively. The outflow nozzle 49b is connected with the canister 45 via the gas passage 47, and the two-way valve 48 intervenes in the gas passage 47.

The evaporative generated in the fuel tank 40 during an engine stop is collected in the separator 49, and is partially liquefied to recirculate into the fuel tank 40. The evaporative further flowed out from the outflow nozzle 49b of the separator 49 and passed through the two-way valve 48 is adsorbed by the canister 45, and it is accumulated until the engine 20 restarts. When the engine 20 restarts and negative pressure occurs in an intake manifold, the evaporative accumulated in the canister 45 flows into the engine 20, and is then combusted. A typical gasoline fuel is supplied to the engine 20 through a fueling pipe 4a connected with a feeding port formed at the center of the upper surface of the front tank portion 41.

The two-way valve 48 interposed in the gas passage 47 between the separator 49 and the canister 45 has a configuration in which check valves 81 and 82 in two directions (each stops a flow until it reaches a given positive pressure or negative pressure) are incorporated into the two-way valve 48 in parallel to each other. The two-way valve 48 switches a flow direction of the gas in the gas passage 47 to a state where only either one of a flow from the separator 49 side to the canister 45 side or a flow in the opposite direction is allowed. Thus, if the engine 20 is in operation, an inflow of open air is allowed from the canister 45 side to the fuel tank 40 side via the separator 49. When the fuel level falls as the fuel in fuel tank 40 is consumed, the open air flows from the canister 45 side into the fuel tank 40 side. In a state where the engine 20 is stopped, the intake of the open air is not performed. In a state where gasoline is supplied and the inside of the fuel tank 40 is made in a closed space, an internal pressure of the fuel tank 40 will increase as the fuel is supplied, and fuel gas will then flow into the canister 45 side from the fuel tank 40 side to be captured by adsorbent.

As shown in FIGS. 2 and 6, the separator 49 is fixed, with a bolt via a bracket, to a rear surface located in a lower part of the right support pillar 15a of the ROPS 15 so that the bottom of the separator 49 is oriented downwardly at a location higher than the fuel tank 40.

MODIFICATIONS (1) The dimensions and shape of the front tank portion 41 and the rear tank portion 42 which constitute the fuel tank 40 is arbitrary as long as the following conditions are met: the front tank portion 41 can be arranged below the operator's seat 50, and the rear tank portion 42 extends higher than the front tank portion 41, lateral to the engine. The dimensions and shape of the transition portion 43 is arbitrary as long as the following conditions are met: fuel flows smoothly from the rear tank portion 42 to the front tank portion 41, and an interference with other members is avoided. The fuel tank 40 may adopt a shape extending to a range beyond the projection cross section of the operator's seat. A third tank portion may be added.

(2) In the above embodiment, the canister 45 is attached to the side face of the rear frame 11; however, alternatively, it may be attached to a lower surface of the installation surface 12 within the boundary area between the engine 20 and the rear tank portion 42. Thus, the canister 45 is preferred to be arranged below the engine 20 or the fuel tank 40; however, as needed, it may be arranged laterally to the engine 20 or the fuel tank 40, and the shape of the canister 45 is also arbitrary.

(3) Although the separator 49 is required to be located higher than the upper end of the fuel tank 40, its fixing location may be other than the ROPS 15. Further, the separator 49 may be omitted depending on the spatial relationship between the fuel tank 40 and the canister 45.

(4) In the above embodiment, although the fuel tank 40 is an integrated piece which is obtained by integrally forming the front tank portion 41, the transition portion 43, and the rear tank portion 42, it may adopt a configuration where these portions are manufactured separately and coupled together later. At this time, each member may be made of different materials. It may also be convenient to manufacture the transition portion 43, which especially prefers flexible characteristics, from a more flexible material which is different from the front tank portion 41 and the rear tank portion 42. As another form, it is also proposed that the transition portion 43 may be manufactured from a hose or a pipe which removably couple the transition portion 43 to the front tank portion 41 and the rear tank portion 42.

The invention claimed is:
1. A riding mower, comprising:
a mower body frame extending in front-and-rear directions between a pair of left and right rear wheels;
a mower deck;
cutting blades;
a horizontal installation surface defined in an area near the rear wheels;
an engine arranged on the installation surface, rearward of one or two axles of the rear wheels;
an operator's seat arranged forward of the engine; and
a fuel tank located on the mower body frame in a manner which contributes to vehicle stability, the fuel tank including:
a front tank portion extending in the front-and-rear directions below the operator's seat;
a rear tank portion connected with the front tank portion, extending in mower body front-and-rear directions on one side of the engine in mower body transverse directions, and extending higher than the front tank portion; and
a rear end of the rear tank portion extending further rearward than an axis of the pair of left and right rear wheels.
2. The riding mower of claim 1, wherein the rear tank portion extends at least to a rear end of the engine in the mower body front-and-rear directions.
3. The riding mower of claim 2, wherein the rear tank portion extends to a rear end of the mower body in the mower body front-and-rear directions.

4. The riding mower of claim 1, wherein a canister connected with the engine and the fuel tank is located below the installation surface and near a boundary between the engine and the rear tank portion.

5. The riding mower of claim 1, wherein the front tank portion extends from a front end part to a rear end part of the operator's seat when seen from above of the mower body, and an upper surface thereof is flat.

6. The riding mower of claim 5, wherein one of front end areas of the front tank portion is recessed so that it creates a quadrangle space, and a battery is arranged in the quadrangle space.

7. The riding mower of claim 1, wherein a fueling unit is mounted to an upper face part of the rear tank portion, and a fueling port of the fueling unit faces outwardly in the mower body transverse direction.

8. The riding mower of claim 7, wherein the fueling port is located rearward of the rear wheels.

9. The riding mower of claim 1, wherein the rear tank portion extends to the height of the engine.

10. The riding mower of claim 9, wherein an outer frame is provided so that it conforms to an outer contour of a rear part of the mower body at the height of the engine, the outer contour defined by the engine and the rear tank portion.

11. A riding mower, comprising:
   a mower body frame extending in front-and-rear directions between a pair of left and right rear wheels;
   a horizontal installation surface defined in an area near the rear wheels;
   an engine arranged on the installation surface, rearward of one or two axles of the rear wheels;
   a pulley arranged below the installation surface and being structured and arranged to transmit power to a mower unit;
   an operator's seat arranged forward of the engine; and
   a fuel tank, the fuel tank including:
      a front tank portion extending in the front-and-rear directions below the operator's seat, said front tank portion having a forward projecting portion and a lateral projecting portion; and
      a rear tank portion connected with the front tank portion, extending in mower body front-and-rear directions on one side of the engine in mower body transverse directions, and extending higher than the front tank portion; and
      a rear end of the rear tank portion extending further rearward than an axis of the pair of left and right rear wheels.

12. The riding mower of claim 11, wherein the pulley transmits power from the engine to the mower unit.

13. The riding mower of claim 11, wherein the pulley is coupled to an output shaft of the engine.

14. The riding mower of claim 11, wherein the pulley is coupled to the mower unit via a belt.

15. The riding mower of claim 14, wherein the belt is arranged in an area that is located below the fuel tank.

16. A riding mower, comprising:
   a mower body frame extending in front-and-rear directions between a pair of left and right rear wheels;
   a mower unit;
   a horizontal installation surface defined in an area near the rear wheels;
   an engine arranged on the installation surface, rearward of one or two axles of the rear wheels;
   an operator's seat arranged forward of the engine; and
   a fuel tank, the fuel tank including:
      a front tank portion extending in the front-and-rear directions below the operator's seat; and
      a rear tank portion connected with the front tank portion, extending in mower body front-and-rear directions on one side of the engine in mower body transverse directions, and extending higher than the front tank portion,
   wherein the front tank portion
      is located forward of a reduced cross-section neck portion, and
   wherein the engine and the rear tank portion are located in an area that includes:
      the installation surface;
      a rear frame;
      a vertical frame member; and
      an outer frame member.

17. The riding mower of claim 16, wherein the outer frame member comprises:
   a portion that is arranged on a rear side of the engine and the rear tank portion; and
   two side portions that are spaced from each other and are arranged on opposite lateral sides of the engine and the rear tank portion.

18. The riding mower of claim 16, further comprising a belt coupled to the mower unit and being arranged in an area that is located below the fuel tank.

19. The riding mower of claim 16, further comprising a pulley adapted to transmit power from the engine to the mower unit via a belt.

20. The riding mower of claim 16, wherein the rear frame is arranged below the installation surface.

* * * * *